United States Patent
Ketteridge et al.

(10) Patent No.: US 8,194,310 B1
(45) Date of Patent: Jun. 5, 2012

(54) ALL FIBER PULSE GENERATOR FOR PUMPING A NON-LINEAR CONVERTER

(75) Inventors: Peter A Ketteridge, Amherst, NH (US);
Peter A Budni, Nashua, NH (US);
Daniel J Creeden, Nashua, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 430 days.

(21) Appl. No.: 12/434,657

(22) Filed: May 3, 2009

(51) Int. Cl.
*H04B 10/17* (2006.01)
(52) U.S. Cl. .................. 359/341.1; 359/341.5; 372/6
(58) Field of Classification Search ............... 359/341.1, 359/341.5; 372/6
See application file for complete search history.

(56) References Cited

U.S. PATENT DOCUMENTS

| | | | |
|---|---|---|---|
| 6,229,828 B1 * | 5/2001 | Sanders et al. ............... 372/22 |
| 6,277,776 B1 | 8/2001 | Clare et al. | |
| 6,288,835 B1 * | 9/2001 | Nilsson et al. ............ 359/341.3 |
| 6,340,806 B1 * | 1/2002 | Smart et al. ............. 219/121.62 |
| 6,434,302 B1 | 8/2002 | Fidric et al. | |
| 6,801,550 B1 | 10/2004 | Snell et al. | |
| 7,106,762 B1 | 9/2006 | Jiang et al. | |
| 7,190,705 B2 * | 3/2007 | Fermann et al. ............... 372/18 |
| 7,298,768 B1 | 11/2007 | Jian | |
| 7,336,858 B1 | 2/2008 | Moore | |

FOREIGN PATENT DOCUMENTS
WO WO 2009149703 A1 * 12/2009

OTHER PUBLICATIONS

S. D. Jackson, "8.8W diode-cladding pumped Tm3+, Ho3+—doped fluoride fibre laser", Electronics Letters, vol. 37, No. 13, pp. 821-822 (Jun. 2001).*
Jiang et al., "Stable 10 ns, KW Peak-Power Pulse Generation from Gain-Switched Thulium-Doped Fiber Laser," Optics Letters, vol. 32, pp. 1797-1799, (2007).*
Tao et al. "Experiments and Theories Investigation of Gain-switched Tm3+-doped double-clad silica fiber laser", 2nd IEEE Conference on Industral Electronics and Applications, pp. 1501-1503, (2007).*

* cited by examiner

*Primary Examiner* — Eric Bolda
(74) *Attorney, Agent, or Firm* — Joseph E. Funk

(57) ABSTRACT

An all fiber mid-IR pulse generator is disclosed that may be used to drive an external non-linear converter. The generator comprises fiber laser oscillator and fiber amplifier elements wherein diode lasers are used to cladding pump the different fiber elements depending on different configurations of the pulse generator. Gain switching of the fiber lasers precludes the need for discrete devices such as Q-switches to generate pulses. The fiber laser and fiber amplifier elements are all fused together, along with fiber isolators and reflective gratings, so there is no free space coupling, and there are no optical elements except as may be needed to couple the output of the generator to a non-linear converter. The all fiber implementation has a single transverse mode at the lowest order mode of operation which results in a nearly diffraction limited output which causes non-linear converters to operate more efficiently. To further increase the efficiency of the non-linear converters the fiber laser oscillator has Bragg gratings with a narrow spectral bandwidth of less than 0.5 nanometers.

16 Claims, 5 Drawing Sheets

ALL FIBER PULSE GENERATOR FOR PUMPING A NON-LINEAR CONVERTER

FIELD OF THE INVENTION

This invention relates to the field of optical systems utilizing fiber laser oscillators and fiber optical amplifiers.

BACKGROUND OF THE INVENTION

Many lasers and amplifier systems utilize extensive opto-mechanical architectures having crystal lasers, lenses, internal minors, cooling means, other optical elements, mechanical mounts and adjustment means for these elements. Accordingly, much attention must be given mounting, adjusting and otherwise calibrating systems utilizing such opto-mechanical architectures. In addition, the more complex such an opto-mechanical system is the higher the costs to build, package, align and maintain same.

Fiber lasers and fiber amplifiers exhibit great potential for applications as high power directed energy sources. They are highly efficient due a combination of low loss and long interaction length. They can produce diffraction-limited single mode outputs, have a very high surface to volume ratio to efficiently dissipate heat and can use all-fiber couplers and reflectors to achieve monolithic, alignment-free resonant cavities. Fiber lasers and amplifiers also offer the advantages of high efficiency, minimal cooling requirements, and good beam quality. Thus, they are a good alternative to prior art opto-mechanical architectures. However, the main problem with fiber lasers and amplifiers is obtaining high power out of a fiber because it requires a significant amount of pumping power.

Thus, there is a need in the art for a fiber laser and amplifier architecture that has few or no opto-mechanical elements, such as previously listed, and that is relatively inexpensive and is easier to build, align and maintain. In addition, there is a need in the art for fiber lasers that can more efficiently pump non-linear converters such as optical parametric oscillators to obtain high power output there from.

SUMMARY OF THE INVENTION

The aforementioned need in the prior art is satisfied by the present invention. A fiber laser and fiber amplifier system is taught that is relatively simple, has few or no opto-mechanical elements, is relatively inexpensive, and is easier to build, align and maintain. In addition, the components of such a system are direct coupled by fusing and permit generating and amplifying all wavelengths in the mid-IR band. Fiber reflectors and fiber isolators are fabricated or installed in series with the fiber oscillators and amplifiers. There is no free space coupling in the fiber laser and fiber amplifier system until its output to a nonlinear converter or other device. The wavelengths which may be amplified are only limited to the emission band of the Thulium doped gain fiber in the fiber laser oscillators and fiber amplifiers of the present system.

The fiber lasers utilize Bragg gratings to create a resonant cavity. Typically, the glass fibers of fiber lasers have a relatively wide spectral bandwidth that decreases the efficiency of operation of a non-linear converter, such as an optical parametric oscillator, that is pumped by the fiber lasers. However, the Bragg gratings utilized in the present invention have a much narrower spectral bandwidth, less than 0.5 nanometers, than the spectral bandwidth of Bragg gratings found in the prior art. This results in a much narrower spectral bandwidth output signal from the fiber lasers which provides for greater efficiency of a non-linear converter being pumped using the output of the fiber laser.

DESCRIPTION OF THE DRAWINGS

The invention will be better understood on reading the Detailed Description in conjunction with the drawings in which:

FIG. 5 is a graph showing the correlation between the pump power input to the fiber laser and amplifier pulse generation system shown in FIG. 4 and the energy of the amplified pulses output there from;

DETAILED DESCRIPTION

The basic invention is a fiber laser and amplifier system that utilizes mostly fiber lasers and amplifiers that are fiber coupled to be relatively simple and have few or no opto-mechanical elements, other than diode laser pumps. As a result, the system is easier to build and to maintain. There is no free space coupling in the fiber laser and fiber amplifier system until its output to a nonlinear converter or other device. The silica fibers of the lasers and amplifiers are Thulium doped and pumped at 795 nm to operate in the 2 μm spectral region and operate at very high efficiencies while producing high average power pulse amplification. This high power, high efficiency operation and emission in the "eye safe" wavelength range has made Thulium doped fiber amplification very promising for a variety of applications. Other dopants may be used as described hereinafter.

There are other advantages to having an all fiber laser and amplifier system. In addition, the all fiber implementation has a single transverse mode at the lowest order mode of operation which results in a nearly diffraction limited output. This causes non-linear converters such as harmonic generators, optical parametric amplifiers and optical parametric oscillators to operate more efficiently. When non-linear converters are driven by the all fiber system of the present invention there is a better beam quality output from the non-linear converters. To increase the operating efficiency of the non-linear converters even further, narrow spectral bandwidth Bragg gratings, having less than 0.5 nanometers bandwidth, are utilized as described in greater detail hereinafter.

Figure 1:
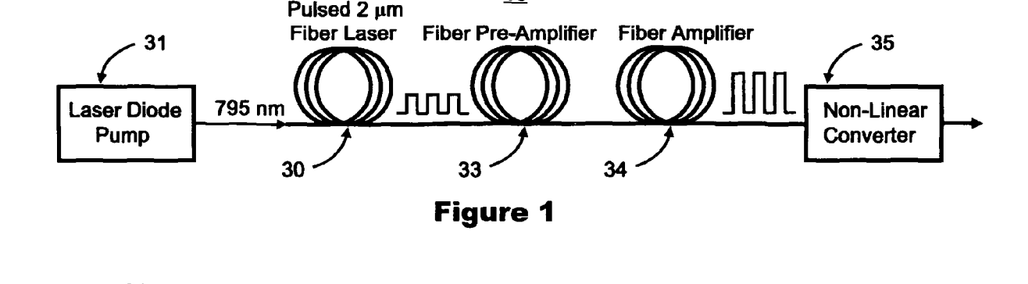
FIG. 1 shows one embodiment of a fiber laser and amplifier pulse generation system.

FIG. 1 shows a basic embodiment of an all fiber pulse generation system 10. Very briefly the basic system comprises a 2 µm output fiber laser oscillator 30 that is pumped by a CW single mode laser diode 31 to generate pulses. Fiber laser oscillator 30 has a resonant cavity formed using narrow spectral bandwidth Bragg gratings as mentioned in the previous paragraph and described in greater detail hereinafter. The output from laser diode 31 is at 795 nanometers and is used to illuminate the gain fiber in laser oscillator 30. To generate the 2 µm pulses fiber laser oscillator 30 operates in a gain switched mode. By utilizing gain switching the need for a separate Q-switch is eliminated. The pulses have a narrow line width that is nominally 20 nanoseconds wide and a repetition rate of 30 kilohertz. By adjusting the gain switching parameters, in a manner known in the art, the pulse repetition rate may be varied between 10 KHz and 1 MHz. This will be the pulse repetition rate output from pulse generation system 10.

Gain switching is a technique in optics by which a laser can be made to produce pulses of extremely short duration, in the order of picoseconds. The optical pulses are generated by injecting a large number of carriers (electrons) into the active region of the device, bringing the carrier density within that region from below the lasing threshold to above the lasing threshold. When the carrier density exceeds that value, the ensuing stimulated emission results in the generation of a large number of photons. However, carriers are depleted as a result of stimulated emission faster than they are injected. Therefore, the carrier density eventually falls back to below lasing threshold which results in the termination of the optical output. If carrier injection has not ceased during this period, then the carrier density in the active region can increase once more and the process will repeat itself.

Briefly, the pulses generated by fiber laser oscillator 30 are input to fiber pre-amplifier 33 to be amplified, and the amplified pulses are input to fiber amplifier 34 to be further amplified. Fiber laser oscillator 30 is described and shown in greater detail with reference to FIG. 2. Fiber amplifiers 33 and 34 are described and shown in greater detail with reference to FIG. 3. The amplified pulses output from fiber amplifier 34 are then used to drive a nonlinear converter 35. Converter 35 may be one of a number of different types of converters including optical parametric generators (OPG), optical parametric amplifiers (OPA), and optical parametric oscillators (OPO), all of which are known in the art. Non-linear crystals used in such nonlinear converters to generate mid-IR output include OPGaAs, ZGP, OPZnSe, PPLN and OPGaN crystals.

The fiber on the output side of fiber laser oscillator 30 is physically and optically connected to the fiber on the input side of fiber pre-amplifier 33, and fiber on the output side of pre-amplifier 33 is physically and optically connected to the fiber on the input side of fiber amplifier 34. This is done using one of a few known techniques. A first of these techniques is to utilize a low temperature fluorophosphate glass to fuse the joint such as taught in U.S. Pat. No. 6,277,776. A second technique is to utilize heat to create a fusion joint between the adjacent ends of the two fibers. In this manner unnecessary optical-mechanical components are eliminated. The first and second segments may be fusion spliced. The first and second segments may also be butt coupled together.

Figure 2:
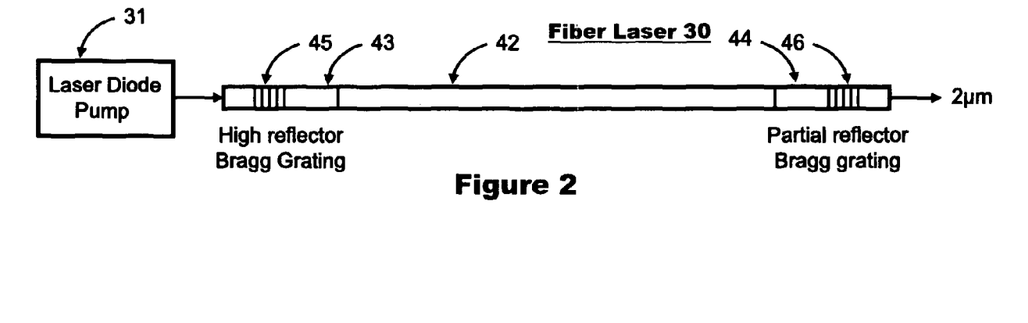
FIG. 2 shows a fiber laser with narrow spectral bandwidth Bragg gratings that generates pulses for driving non-linear converters with optimum efficiency and is used in implementing the present invention.

FIG. 2 shows a fiber laser oscillator 30 that can operate in a gain switched mode to generate pulses and is used in implementing the present invention. Fiber laser 30 includes a gain fiber 42 formed of a low phonon energy glass host, either fluoride based or an oxide-based multi-component glass such as germanium or tellurite, that is doped with triply ionized rare-earth thulium or holmium oxide or mixtures thereof. In the present invention the gain fiber is doped with a concentration of 0.5 to 15% by weight which produces adequate gain, hence output power levels at 2 µm wavelength for fiber lengths less than 5 cm and preferably less than 3 cm to enable stable single-frequency operation.

Erbium or ytterbium dopants may also be added to absorb and then transfer pump energy to the active ions. The low phonon energy glass host is selected from either an oxide-based multi-component germanate or tellurite glasses or a fluoride based glass. These host glasses have sufficiently low phonon energy to slow down the multi-phonon relaxation process.

Fused to the input end of gain fiber 42, in a matter known in the art, is a piece of passive silica fiber 43 in which is formed special narrowband fiber gratings 45. Fused to the output end of gain fiber 42, in a matter known in the art, is a piece of passive silica fiber 44 in which is formed special narrow band fiber gratings 46. These are known as Bragg gratings. The two fiber gratings 45 and 46 form a resonant cavity that provides the feedback necessary to sustain laser operation in the fiber. In accordance with the teaching of the present invention the Bragg gratings have a much narrower spectral bandwidth of less than 0.5 nanometers as described in greater detail hereinafter. The reflectivity of the input grating 45 should be as close to 100% as possible for an oscillation at a wavelength of 2 µm. In the embodiments of the invention described herein the reflectivity of grating 45 is greater than 99%. The reflectivity of the output narrowband grating 46 is less than 100%, suitably in the range of 20% to 90% depending upon the pump power and target output power, such that power at a wavelength of 2 µm can be removed from the cavity. In the embodiments of the invention described herein the reflectivity of grating 46 is in the order of 20%.

Briefly, a diffraction grating is a row of fine parallel lines, usually on a reflective surface. Light waves bounce off of the lines at an angle that depends on their wavelength, so light reflected from a diffraction grating spreads out in a spectrum. In fiber gratings, the lines are not grooves etched on the surface, instead they are variations in the refractive index of the fiber material. The variations scatter light by what is called the Bragg effect. Bragg effect scattering is not exactly the same as diffraction scattering, but the overall effect is similar. Bragg scattering reflects certain wavelengths of light that resonate with the grating spacing while transmitting other light.

Conventionally, fiber Bragg gratings are fabricated by exposing fiber to high energy ultraviolet (UV) light so as to change the bonding state of the inner molecular structure and induce a refractive index modification in photosensitive material in the fiber core in a manner known in the art. This technique is dependent on the ability to create a predetermined pattern of exposed and unexposed regions of material, to give the desired periodic variation of refractive index. To achieve this periodicity, a common method is the use of an interference fringe pattern of UV light generated with a phase mask or two interfering beams.

The spectral bandpass of the input and output Bragg gratings of a laser must overlap each other spectrally, otherwise the oscillator will not lase. There are a few configurations of this. The first configurations is that the spectral bandpass of the high reflectivity grating at the input side of a laser is narrow and the spectral bandpass of the partially reflective grating at the output side of a laser is broad such that the input side spectral bandpass overlaps the output side spectral bandpass. The second configuration is when the spectral bandpass of the high reflectivity grating at the input side of a laser is broad and the spectral bandpass of the partially reflective grating at the output side of a laser is narrow such that the output side spectral bandpass overlaps the input side spectral bandpass. There is a third configuration where the spectral bandpass of both the high reflectivity grating at the input side of a laser and the low reflectivity grating at the output side of the laser are both narrow and must exactly match each other. The third configuration is difficult to achieve in practice.

There is a need to have a narrow spectral bandwidth for the Bragg gratings of a laser oscillator in order to convert the laser energy from the oscillator in a non-linear converter such as an optical parametric oscillator. If the spectral lines are too broad a non-linear converter will not convert or it will not convert efficiently. The optimum condition is to have the spectral width of the Bragg gratings within the spectral bandwidth acceptance of the non-linear converter. In the prior art the spectral bandwidth of Bragg gratings is typically between 2 and 10 nanometers. This is sufficient to permit conversion in a non-linear converter. In the present system the spectral bandwidth of at least one of the Bragg gratings of a laser oscillator is less than 0.5 nanometers which provides even greater conversion efficiency in the non-linear converter. When combining this gain in efficiency of operation with that achieved by an all fiber implementation having a single transverse mode at the lowest order mode of operation providing nearly diffraction limited output, the overall gain in operating efficiency is significant.

The pump energy for fiber laser 30 comes from laser diode pump 31 at a wavelength of 795 nanometers and passes easily through input Bragg grating 45. The pump energy causes the Thulium doped fiber 42 to oscillate at a wavelength of 2 μm. More detail concerning fiber laser 30 may be found in U.S. Pat. No. 7,106,762.

Figure 3:
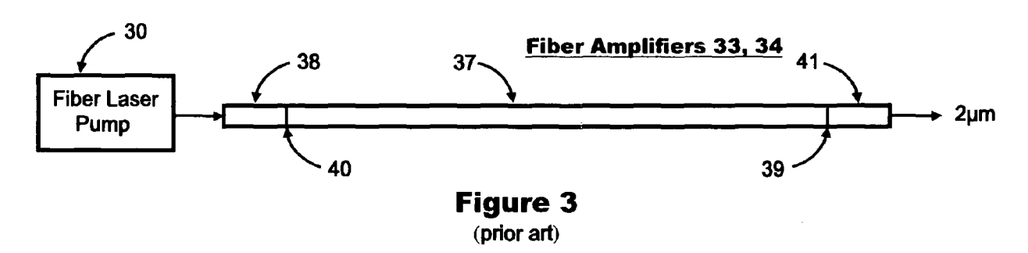
FIG. 3 shows a fiber amplifier that is used in implementing the present invention.

FIG. 3 shows a fiber amplifier that is used for fiber pre-amplifier 33 and fiber amplifier 34 that are used to amplify pulses generated by fiber laser 30 in implementing the present invention. Fiber amplifiers 33 and 34 each include a gain fiber 37 comprising a heavy metal oxide glass host selected from germanate, tellurite and bismuth oxide glasses that exhibit low phonon energy thereby providing high quantum efficiency. These glasses exhibit good mechanical properties and can be pulled into fibers. The host glass is doped with triply ionized thulium oxide ions at least 2% by weight, and preferably at least 4% by weight to achieve the necessary ion concentration and increase quantum efficiency. The concentration of Thulium ions is high enough that energy transferred by the phenomenon of cross-relaxation will enhance laser emission at 2 μm and suppress emission at any other wavelengths. The quantum efficiency is preferably at least 100%, and most preferably at least 150%.

Fused to the input end of gain fiber 37, in a matter known in the art, is a piece of fiber 38 having a reflector 40 formed on one end thereof and the end with reflector 40 is butt coupled to the input end of gain fiber 37. Similarly, fused to the output end of gain fiber 37, in a matter known in the art is another piece of fiber 41 having a reflector 39 formed on one end thereof and the end with reflector 39 is butt coupled to the output end of gain fiber 37. Reflectors 39 and 40 positioned at opposite ends of gain fiber 37 form a resonant cavity. The reflectivity of reflector 40 should be as close to 100% as possible to increase the efficiency of the amplifier. The reflectivity of output reflector 39 is less than 100%, suitably in the range of 2%-99% depending upon the pump power and target output power, such that power can be extracted from the cavity formed by reflectors 39 and 40. Laser emission in the cavity can be either single and multi-transverse mode, or single and multi-longitudinal mode, depending upon the cavity design, e.g. length and gratings. More detail concerning fiber amplifiers 33 and 34 may be found in U.S. Pat. No. 7,298,768.

Figure 4:
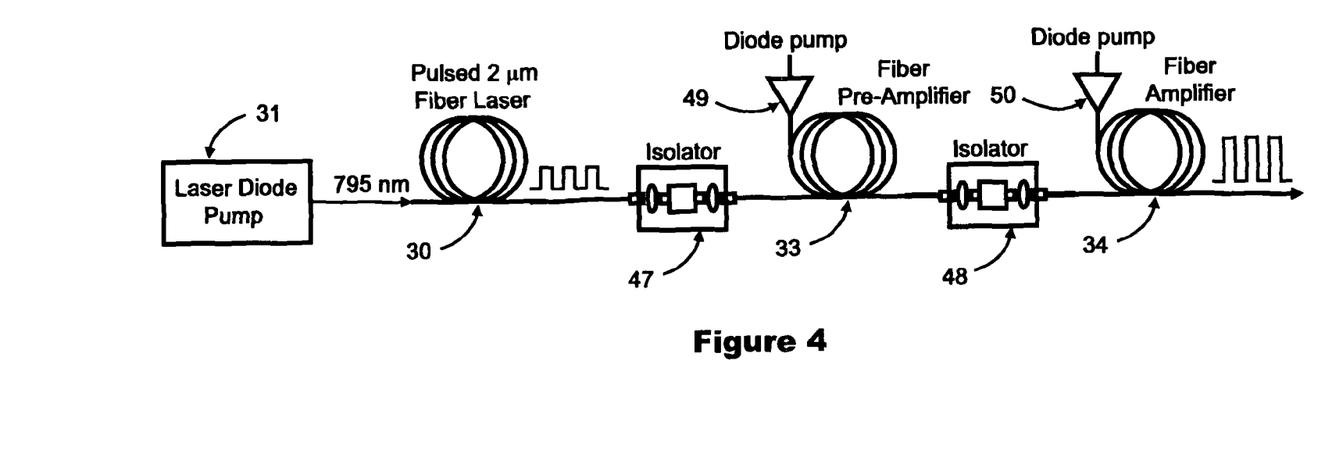
FIG. 4 shows another embodiment of a fiber laser and amplifier pulse generation system in which diode pumps are used to input energy into the individual laser amplifiers to increase the amplification of the pulses.

FIG. 4 shows another embodiment of a fiber laser and amplifier pulse generation system in which diode pumps are used to input pump energy into the individual laser amplifiers 33 and 34 to increase the amplification of the 2 μm pulses from gain switched fiber laser 30. Laser diode pump 31 generates a 795 μm output signal that pumps gain switched fiber laser 30 to generate 2 μm pulses, as previously described with reference to FIG. 1. The system shown in FIG. 4 produces greater than 20 watts of average output power at 2 μm with 20 nanosecond pulses at a 100 kHz repetition rate.

The 2 μm seed pulses output from fiber laser 30 pass through an isolator 47 to fiber pre-amplifier 33 which is a non-polarization maintaining large mode area fiber amplifier. Pre-amplifier 33 is the same as FIG. 1 except its gain fiber is being cladding pumped by a diode pump 49 that is outputting a 25 Watt, 795 nm pump signal. Isolator 47 is shown as a discrete device in FIGS. 4 and 7 but, most preferably, is an in fiber element that is fused to the light incoming face of the optical fiber of fiber pre-amplifier 33. The isolators are provided between stages to prevent feedback from one stage to a previous stage. In addition, the optical isolators polarize the beam. Isolators are described in greater detail hereinafter.

Cladding pumping is also utilized for fiber amplifier 34 so is discussed after the description of fiber amplifier 34. Briefly, the diode pumps are spliced to the doped gain fiber of the fiber amplifiers using a fiber coupler. Isolators are described in further detail herein below.

The 2 μm pulses from fiber laser 30 are randomly polarized so pre-amplifier 33 operates at a 26% slope efficiency as a result of the relatively low seed pulse energy which is coupled to the fiber core of pre-amplifier 33. The operation of pre-amplifier 33 does result in a gain of approximately 16 dB resulting in greater than 4 watts of output power. The output from pre-amplifier 33 is polarized with an extension ratio of 5:1 as a result of tight core length of the fiber which induces birefringence in the core.

There is an in fiber isolator 48 that is fused to the light incoming face of the optical fiber of fiber amplifier 34. Isolator 47 prevents feedback from fiber amplifier 34 to fiber pre-amplifier 33. In addition, optical isolator 47 also polarizes the beam.

Figure 7:
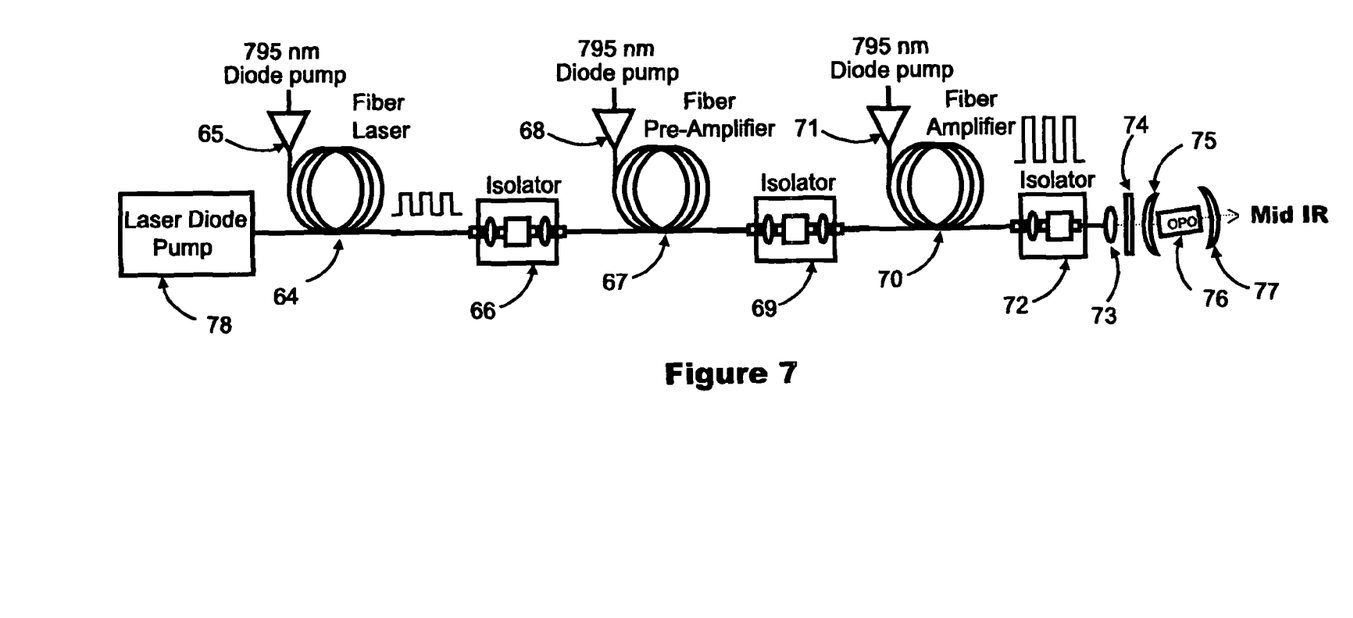
FIG. 7 shows another embodiment of a fiber laser and amplifier pulse generation system in which diode pumps are used to input energy into the fiber laser generating the pulses and the fiber amplifiers to increase the amplification of the pulses before they are used to pump an optical parametric oscillator (OPO).

Optical isolators are shown in FIGS. 4 and 7 between various ones of the fiber lasers and fiber amplifiers which makes them appear as they are separate optical elements connected in series with the fibers of the fiber elements. This is only done to easily show the isolators in the block diagrams. In reality the isolators are in-fiber and are fused in series with fibers of the lasers and amplifiers. For example, the isolators may be a piece of high birefringence passive fiber with a tilted Bragg grating is connected to the active fiber at one end with the connection region stripped and potted to remove pump and s-polarized signals. The other end of the high birefringence fiber is fusion spliced to a low birefringence fiber and oriented so that the birefringent axes are parallel. The low birefringence fiber then passes straight through a gap in a linear magnetic array calculated to cause a 45 degree Faraday rotation. The far end of the low birefringence fiber is connected to another high birefringence passive fiber with a tilted Bragg grating but with the birefringent axes of the birefringence fiber rotated by 45 degrees with respect to those of the low birefringence fiber. Backward light transmitted by the second Bragg grating will then be removed by the first Bragg grating. Such an in fiber optical isolator used for high power operation is taught in U.S. Pat. No. 7,336,858.

The amplified 2 μm pulses output from fiber pre-amplifier 33 are input to fiber amplifier 34 to be further amplified. The description of fiber amplifier 34 is the same as for fiber pre-amplifiers 33 except its gain fiber is being cladding pumped by diode pump 50 that is outputting a 55 Watt, 795 nm pump signal.

Transparency is reached in fiber amplifier 34 at a pump power of 10 Watts, and the total gain in this amplifier is 8 dB, resulting in the total system game of approximately 24 dB. This gain is a limited by the available pump power. The maximum pulse energy generated from this system is 330 μJ at 50 kHz with 13 nanosecond wide pulses, corresponding to 24.5 kW of peak power. At a 100 kHz pulse rate, 211 μJ of pulse energy is generated with 20 nanosecond wide pulses, resulting in 10.5 kW of peak power. Beam quality was measured to be $M^2<1.2$.

The slope efficiency in the amplifier is 43% at 100 kHz and 32% at 50 kHz, with respect to the pump power. These efficiency may be improved by increasing the seed power. In addition, operating a slightly longer wavelength may improve further ample for efficiency as signal absorption decreases. Graphs in showing this information are shown in described with reference to FIGS. 5 and 6.

Figure 5:
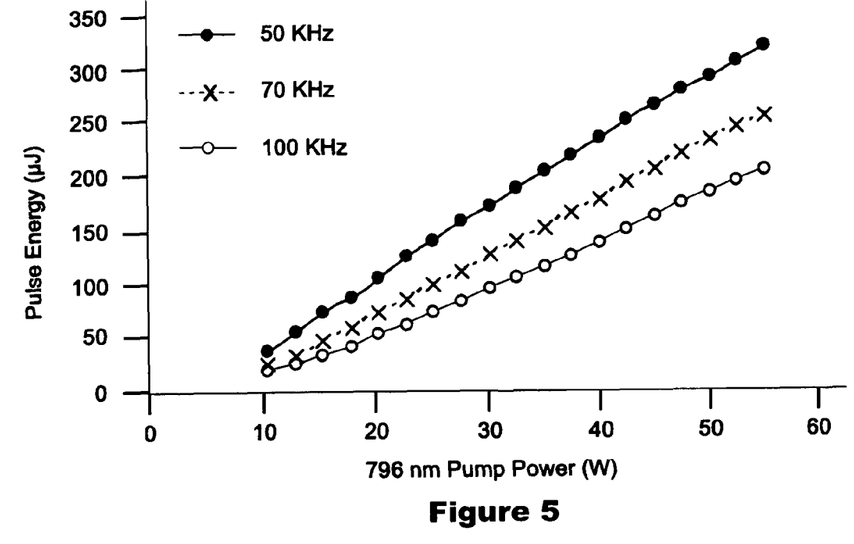

FIG. 5 is a graph showing the correlation between the pump power input to the fiber laser and amplifier pulse generation system shown in FIG. 4 and the energy of the amplified pulses output there from. There are three plots in FIG. 5, one for each of pulse rates 50 kHz, 70 kHz and 100 kHz and they show the increase in pump power for lower pulse energy as the pulse rate decreases.

Figure 6:
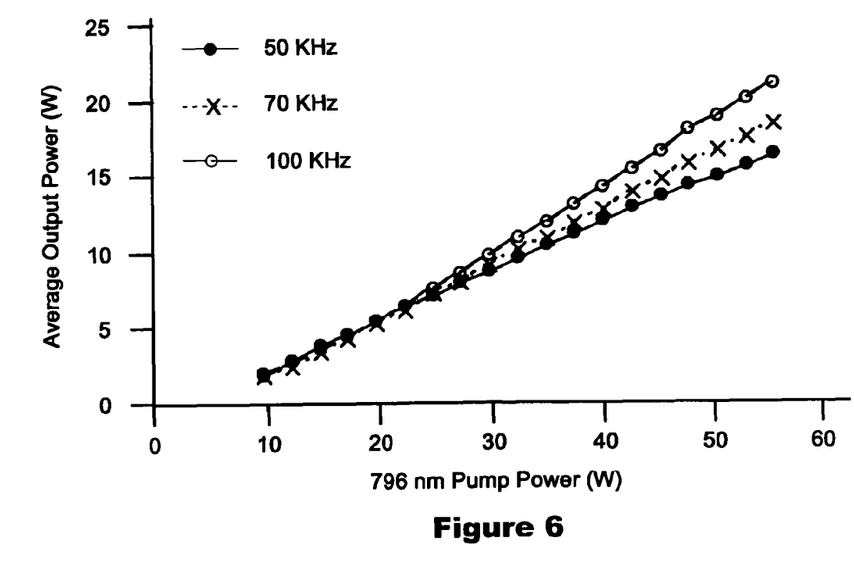
FIG. 6 is a graph showing the correlation between the average output power from the fiber laser and amplifier pulse generation system shown in FIG. 4 and the energy of the pump power input to the system as a function of the frequency of the pulses generated by the system.

FIG. 6 is a graph showing the correlation between the average output power from the fiber laser and amplifier pulse generation system shown in FIG. 4 and the energy of the pump power input to the system as a function of the frequency of the pulses generated by the system. There are three plots in FIG. 6, one for each of pulse rates 50 kHz, 70 kHz and 100 kHz.

FIG. 7 shows an alternative embodiment of a fiber laser and amplifier pulse generation system in which diode pumps 65, 68 and 71 are used to input energy into the fiber laser 64 generating the pulses and the fiber amplifiers 67 and 70 in order to increase amplification of the pulses before they are used to pump an optical parametric oscillator (OPO). As may be seen in FIG. 7 fiber amplifiers 67 and 70 are the same as fiber amplifiers 33 and 34 and FIG. 4, so they are not described again at this point.

The major differences in FIG. 7 is that fiber laser 64 is pumped by a diode pump 65 in addition to being pumped by laser diode pump 78. This increases the power of the 2 μm pulses output from fiber laser 64 which will increase the power output from the overall fiber laser and amplifier system. More particularly, fiber laser 64 is a master oscillator/fiber amplifier configuration wherein the Thulium doped fiber is gain switching and produces 30 nanosecond pulses at 1.995 μm at a 100 kHz repetition rate. The pulses produced by fiber laser 64 are then further amplified by fiber amplifiers 67 and 70.

Fiber pre-amplifier 67 is Thulium doped and is cladding pumped by 25 watts from 795 nm fiber coupled diode pump 68. Fiber amplifier 70 Thulium doped and is cladding pumped by 55 watts from 795 nm fiber coupled diode pump 68. As a result, the original seed pulses output from fiber laser 64 are amplified more than 24 dB to 21 watts of average output power in a near diffraction limited being with an $M^2=1.1\pm0.05$. As a result of using output isolator 72 only 60% of the 21 watts of the power output from fiber amplifier 70, or 12.7 watts of linearly polarized 1.995 μm light is available to pump optical parametric oscillator (OPO) 76.

The isolated power output from fiber amplifier 70 and passing through isolator 72 is focused through a lens 73 to a 170 μm $1/e^2$ diameter, resulting a maximum effect of peak intensity of 37.2 MW/cm$^2$. Half wave plate 74 is used to rotate the polarization of 10 cmcc with respect to the OPO crystal 76 for proper phase matching. In the experiments the OPO was run in a con-focal single resonant (SRO) configuration, with a 10 cmcc reflector as an input mirror 75 having a reflectivity close to 100%, and a 10 cmcc reflector as an output mirror 77 having a reflectivity of 95% at the signal wavelengths output from the OPO.

Figure 8:
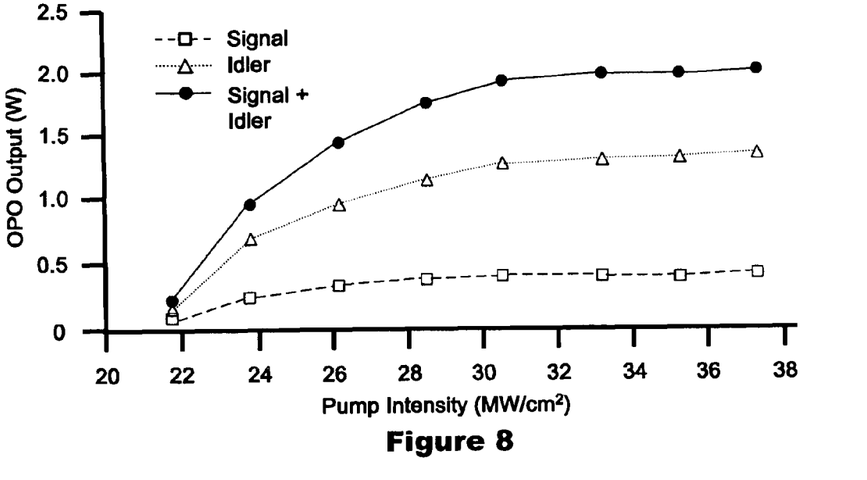
FIG. 8 is a graph showing the correlation between the total output power from the OPO driven by the fiber laser and amplifier pulse generation system of FIG. 7, including the amount of power in the idler and signal beams, and the intensity of the pump beam from the fiber amplifiers driving the OPO.

FIG. 8 is a plot showing the correlation between the total output power from the OPO driven by the fiber laser and amplifier pulse generation system of FIG. 7, including the amount of power in the idler and signal beams of the OPO, and the intensity of the 1.995 μm pulsed pump beam from the fiber amplifiers driving the OPO. The total OPO power measurement was taken using a long pass filter while the signal and idler being power measurements were taken using appropriate band pass filters.

As may be seen in the plot the threshold for the OPO in FIG. 7 is approximately 21 MW/cm$^2$, and at the highest output power the OPO is running at only 1.8 times above threshold, generating 2 watts of total mid-IR output power. More than 1.3 watts of the total power is from the idler beam in the 4.0-5.0 μm spectral region. The remaining power is in the signal beam in the 3.4-4.0 μm spectral region. The total mid-IR conversion efficiency in OPO 76 is 15.7%. Present non-linear converter technology coupled with the all fiber technology taught herein permits operation beyond the mid-IR between 3.0 μm and 18 μm.

The rollover in the mid-IR output power is caused by thermal effects as result of the uncooled OPO crystal and the pump beam being focused into such a small spot, resulting in very strong thermal lensing in the OPO crystal. For the experiment described with reference to FIG. 8 to OPO crystal was a ZGP crystal. The pump spot size can be increased slightly to alleviate the thermal lensing. However, because of the relatively low peak power in the pump (4.2 kW) a small beam spot is required to achieve the high peak intensity needed to reach threshold. The strong thermal lens in the relatively low level of pump depletion does result in good beam quality for both the signal and idler beam waves. Signal beam quality was measured to be $M^2=1.15\pm0.05$ and the idler beam quality was measured to be $M^2=1.2\pm0.05$. Prior to the thermal rollover the mid-IR slope is approaching 50% with respect to the instant pump power, showing the potential for a high-efficiency, high-power, fiber pumped mid-IR OPO.

Figure 9:
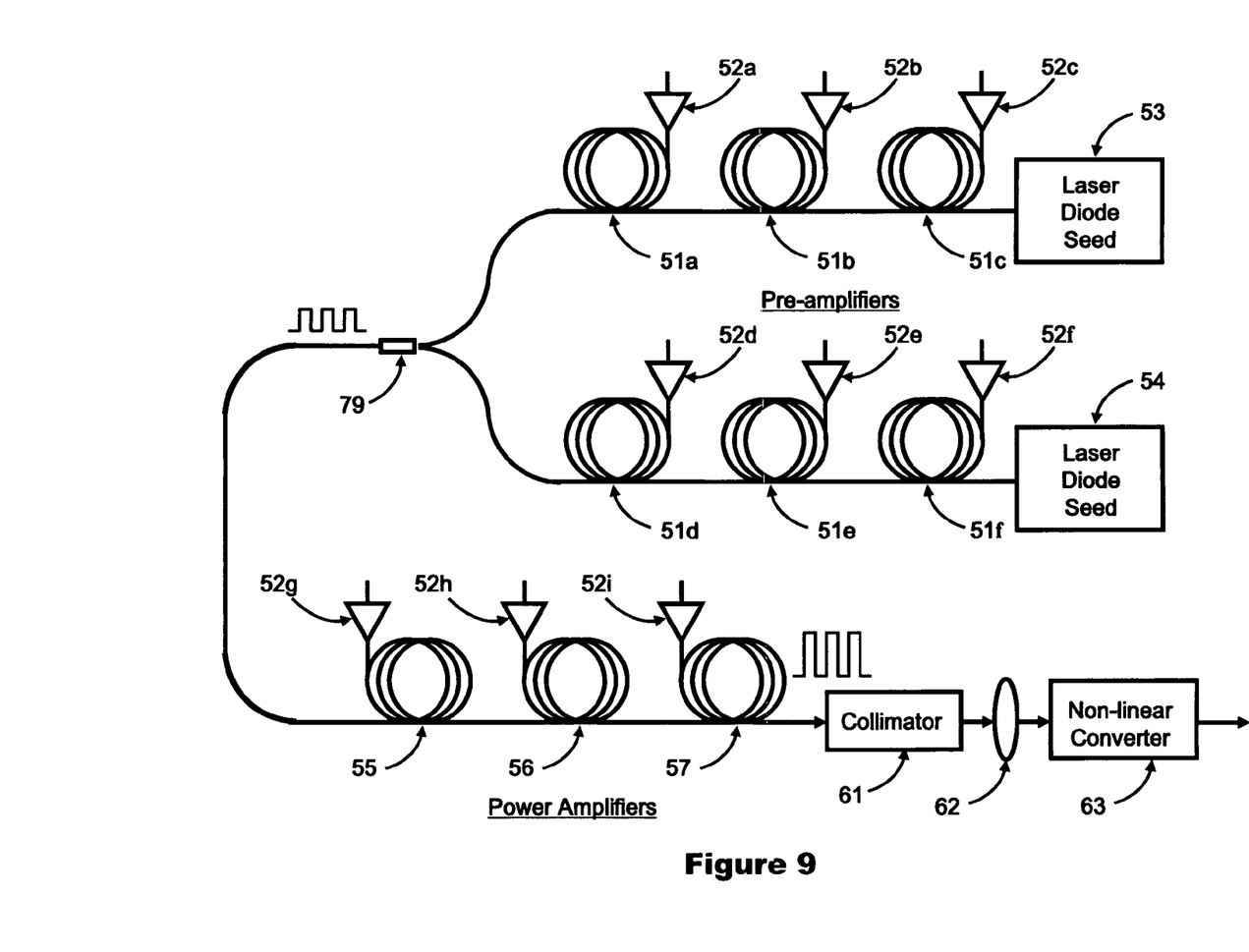
FIG. 9 shows a monolithic fiber laser and amplifier pulse generation system in which multiple multi-stage fiber amplifiers are used in tandem to produce amplified pulse and the amplified pulses output of the multi-stage fiber amplifiers are combined and amplified further in fiber power amplifiers.

FIG. 9 shows a monolithic fiber amplifier system in which multiple multi-stage fiber amplifiers are used to amplify input pulses and amplified pulses output from different ones of the multi-stage fiber amplifiers are combined and amplified further in fiber power amplifiers to produce more than 20 watts of average power output. The individual pre-amplifiers 51*a-f* and the power amplifiers 55, 56 and 57 are all cladding pumped by pumping diodes 52*a-i* as shown. To show that the all fiber design of the present invention does not have to have Thulium doped fibers in the lasers and amplifiers the gain fibers of these fiber amplifiers are all Yerbium (Yb) doped. The operation of the individual diode pumped fiber amplifiers is the same as previously described with reference to FIGS. 4 and 7 so is not repeated here for the sake of brevity. In addition, isolators are not used between the many fiber amplifier stages yielding a fiber system with the advantages thereof in accordance with the teaching of the invention. The all fiber amplifier system requires limited alignment and provides a flexibility that is not easily achieved in conventional on optomechanical amplifier systems. The use of fiber allows for efficient pump pulse amplification and compact packaging.

Further, the amplified outputs from series connected fiber amplifiers 51a-c and from series connected fiber amplifiers 51d-f are combined in a fiber optic combiner 64, such as taught in U.S. Pat. No. 6,434,302. Briefly, combiner 64 comprises a plurality of combined multimode fibers bundled and fused together and pulled to form a coupler that has a converging or monotonically decreasing taper down to a minimum diametrical waist followed by a diverging or monotonically increasing taper, also referred to as a negative taper extending to a nominal diameter of an output fiber or combined output fibers and is optically coupled thereto such as by means of fusion-splicing.

The combined outputs of amplifiers 51a-c and 51d-f from fiber combiner 64 is a single signal that is input to the series connected string of power amplifiers 55, 56 and 57. The amplified signal is collimated through collimator 61 and is focused by lens 62 into a crystal of a nonlinear converter 63. Converter 63 may be one of a number of different types of converters including a harmonic generator or an optical parametric oscillator (OPO), all of which are known in the art.

In FIG. 9 laser diodes 53 and 54 may both output seed pulses having a single pulsed wavelength λ1 to be amplified in the series connected fiber amplifiers connected to the respective diodes 53 and 54. Alternatively, laser diode 53 may output a pulsed wavelength λ1, and laser diode 54 may output a pulsed wavelength λ2. Either way the combined signals output from combiner 64 are amplified by power amplifiers 55, 56 and 57.

Briefly, fiber cladding pumping of the pump diodes in FIGS. 4, 7 and 9 is accomplished by splicing the pump diodes in line with the doped gain fiber of the fiber lasers and fiber amplifiers using a fiber coupler. There are many ways known in the art of accomplishing this. One method is taught in U.S. Pat. No. 6,801,550.

Although optical isolators are not shown in FIG. 9 they may be provided between stages to prevent feedback between the stages as previously described in detail.

While what has been taught herein are various embodiments of fiber laser and fiber amplifier systems, those skilled in the art will understand that numerous changes may be made without departing from the scope and spirit of the invention.

The invention claimed is:

1. Apparatus for generating a stream of pulses for driving a non-linear optical converter, the apparatus comprising;
    a gain switched fiber laser oscillator providing a pulse stream output;
    a continuous wave laser diode cladding pumping the fiber laser oscillator;
    a first set of fiber amplifiers for amplifying the pulse stream output from the fiber laser oscillator and having an output at which are the amplified signals;
    a second set of fiber amplifiers for amplifying the pulse stream output from the fiber laser oscillator and having an output at which are the amplified signals;
    a third set of fiber amplifiers;
    a CW laser diode cladding pumping each of the fiber amplifiers in the first, second and third sets of fiber amplifiers; and
    a fiber combiner combining the amplified signals at the output of each of the first and second sets of fiber amplifiers;
    wherein the combined amplified signals from the fiber combiner are input to the third set of fiber amplifiers to be further amplified;
    wherein the fiber laser oscillator, all the fiber amplifiers and the fiber combiner are all spliced together without non-fiber elements.

2. The apparatus of claim 1 wherein all the fiber amplifiers comprising the first set, second set and third set of fiber amplifiers have a gain fiber that is doped with Thulium.

3. The apparatus of claim 2 wherein the output of the third set of fiber amplifiers has a wavelength of between 1.8 μm and 2.15 μm.

4. The apparatus of claim 3 further comprising a fiber isolator spliced to the input fiber of each of the first set, second set and third set of fiber amplifiers, each isolator blocking signals from exiting the input of the amplifier to which they are spliced.

5. The apparatus of claim 4 further comprising a non-linear converter that is an optical parametric oscillator generating wavelengths in the mid-IR band.

6. The fiber oscillator/amplifier apparatus of claim 2 wherein the fiber amplifiers and the fiber laser oscillator each have a gain fiber that is doped with Thulium ions at a concentration of at least 2% by weight, and preferably at least 4% by weight.

7. The fiber oscillator/amplifier apparatus of claim 6 wherein the pulse stream output from the oscillator is at a frequency between 10 KHz and 1 MHz.

8. The apparatus of claim 7 further comprising a fiber isolator spliced to the input fiber of each of the amplifiers, each isolator blocking signals from exiting the input of the amplifier to which they are spliced.

9. The apparatus of claim 8 wherein the non-linear optical converter is an optical parametric oscillator capable of generating all wavelengths in the mid-IR band.

10. The fiber oscillator amplifier apparatus of claim 1 wherein the fiber amplifiers are co-doped with both Thulium and Holmium.

11. The fiber oscillator/amplifier apparatus of claim 10 wherein the pulse stream output from the fiber laser oscillator has a wavelength of between 1.8 μm and 2.15 μm, and wherein the laser diode pumping the fiber laser oscillator generates a continuous wave having a wavelength of approximately 0.795 μm.

12. The fiber oscillator/amplifier apparatus of claim 11 wherein the pulse stream output from the oscillator is at a frequency between 10 KHz and 1 MHz.

13. The fiber oscillator/amplifier apparatus of claim 12 wherein the non-linear optical converter is an optical parametric oscillator capable of generating all wavelengths in the mid-IR band.

14. The apparatus of claim 13 further comprising a fiber isolator spliced to the input fiber of each of the amplifiers, each isolator blocking signals from exiting the input of the amplifier to which they are spliced.

15. The fiber oscillator/amplifier apparatus of claim 1 wherein the pulse stream output from the fiber laser oscillator and from the fiber amplifiers is at a 100 kHz rate and the pulses are each about 20 nanoseconds wide.

16. The fiber oscillator/amplifier apparatus of claim 15 wherein the non-linear optical converter is an optical parametric oscillator capable of generating all wavelengths in the mid-IR band.

* * * * *